United States Patent
Sansoe

(10) Patent No.: US 11,744,367 B2
(45) Date of Patent: Sep. 5, 2023

(54) BRACKET APPARATUS FOR TOOL-LESS ASSEMBLY OF FURNITURE

(71) Applicant: Hillsdale Furniture LLC, Louisville, KY (US)

(72) Inventor: Matthew Sansoe, Concord, CA (US)

(73) Assignee: HILLSDALE FURNITURE LLC, Louisville, KY (US)

( * ) Notice: Subject to any disclaimer, the term of this patent is extended or adjusted under 35 U.S.C. 154(b) by 0 days.

(21) Appl. No.: 17/468,282

(22) Filed: Sep. 7, 2021

(65) Prior Publication Data

US 2023/0071622 A1    Mar. 9, 2023

(51) Int. Cl.
*A47B 96/00*    (2006.01)
*A47B 96/06*    (2006.01)
*A47B 96/14*    (2006.01)

(52) U.S. Cl.
CPC ............ *A47B 96/06* (2013.01); *A47B 96/145* (2013.01); *A47B 2220/0036* (2013.01)

(58) Field of Classification Search
None
See application file for complete search history.

(56) References Cited

U.S. PATENT DOCUMENTS

| | | | |
|---|---|---|---|
| 3,697,034 A | 10/1972 | Shell | |
| 4,387,872 A | 6/1983 | Hogue | |
| 5,964,438 A * | 10/1999 | Camilleri | A47B 95/008 |
| | | | 248/323 |
| 6,230,910 B1 * | 5/2001 | Olsson | A47B 57/50 |
| | | | 248/221.11 |
| 6,367,880 B1 | 4/2002 | Niederman et al. | |
| 7,252,273 B2 | 8/2007 | Lewellen et al. | |
| 8,353,494 B2 * | 1/2013 | Peng | A47B 88/43 |
| | | | 248/221.11 |
| 8,967,565 B2 * | 3/2015 | Chen | H05K 7/1489 |
| | | | 248/221.11 |
| 8,967,567 B2 | 3/2015 | Chen et al. | |
| 9,119,471 B2 * | 9/2015 | Gonzalez | A47B 96/061 |
| 9,125,489 B2 * | 9/2015 | Chen | A47B 88/43 |
| 9,532,483 B1 * | 12/2016 | Chang | F16B 2/12 |
| 9,581,182 B2 | 2/2017 | Selle | |

(Continued)

FOREIGN PATENT DOCUMENTS

| | | |
|---|---|---|
| CN | 203969818 | 12/2014 |
| GB | 2240375 | 7/1991 |
| KR | 20170053961 | 5/2017 |

OTHER PUBLICATIONS

Locking Safety Bed Rail Brackets, retrieved Jun. 30, 2021 from https://www.rockler.com/locking-safety-bed-rail-brackets 2020.

(Continued)

*Primary Examiner* — Steven M Marsh
(74) *Attorney, Agent, or Firm* — BRYAN CAVE LEIGHTON PAISNER LLP

(57) ABSTRACT

This disclosure relates to a bracket apparatus for tool-less assembly of furniture products. The furniture products are equipped with a bracket apparatus that enables the furniture products to be assembled and disassembled without the use of tools or additional hardware. The bracket apparatus integrated into the furniture products permits the furniture products to easily switch between an assembled configuration and a disassembled configuration.

12 Claims, 4 Drawing Sheets

(56) References Cited

U.S. PATENT DOCUMENTS

| | | | |
|---|---|---|---|
| 9,657,891 B1* | 5/2017 | Tatem | F16M 13/02 |
| 10,292,496 B2* | 5/2019 | Chen | F16B 2/10 |
| 10,519,997 B2 | 12/2019 | Stauss et al. | |
| 11,134,583 B2* | 9/2021 | Chen | H05K 7/1491 |
| 2004/0079719 A1 | 4/2004 | Weaver et al. | |
| 2004/0084394 A1 | 5/2004 | Powell | |
| 2005/0269156 A1 | 12/2005 | Lanzafame | |
| 2011/0255915 A1 | 10/2011 | Chen et al. | |
| 2015/0059090 A1 | 3/2015 | Cacioppo | |
| 2021/0068547 A1 | 3/2021 | Hodgson et al. | |

OTHER PUBLICATIONS

International Search Report and Written Opinion for Int'l Application No. PCT/US22/42609 dated Dec. 15, 2022 Dec. 15, 2022.

* cited by examiner

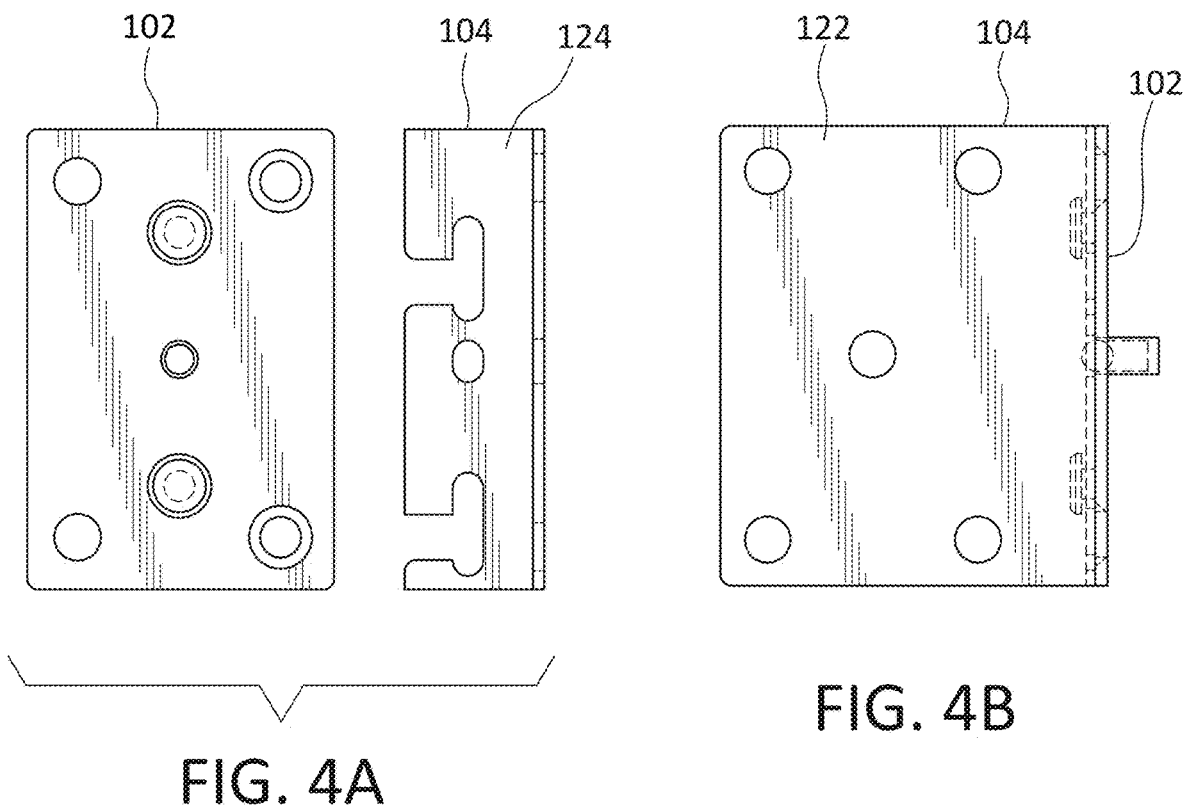
FIG. 4A
FIG. 4B
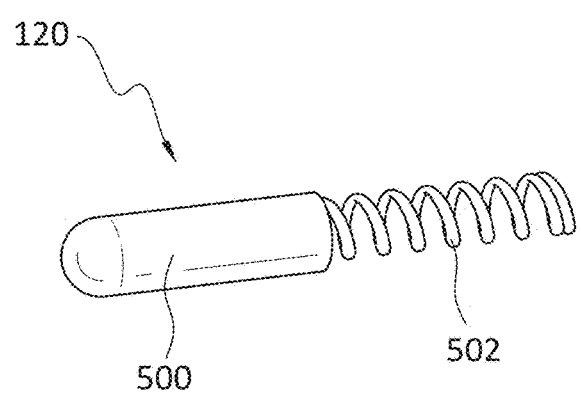
FIG. 5

BRACKET APPARATUS FOR TOOL-LESS ASSEMBLY OF FURNITURE

TECHNICAL FIELD

The present disclosure is directed to a bracket apparatus for tool-less assembly of furniture.

BACKGROUND

Many different furniture items, such as couches, chairs, and tables, have multiple components that need to be assembled prior to use. Having multiple components can be beneficial in many scenarios including shipping the furniture items and for storing the furniture items. However, tools (e.g., wrenches or screwdrivers) and hardware (e.g., bolts or screws) are often required to assemble and dissemble the furniture items before such items can be shipped or stored.

BRIEF DESCRIPTION OF DRAWINGS

To facilitate further description of the embodiments, the following drawings are provided, in which like references are intended to refer to like or corresponding parts, and in which:

FIG. 4A is an alternate view of the exemplary bracket apparatus shown in FIG. 1A according to certain embodiments;

FIG. 4B is another alternate view of the exemplary bracket apparatus shown in FIG. 4A according to certain embodiments;

FIG. 5 is a top perspective view of an exemplary biasing element according to certain embodiments.

Figure 1A:
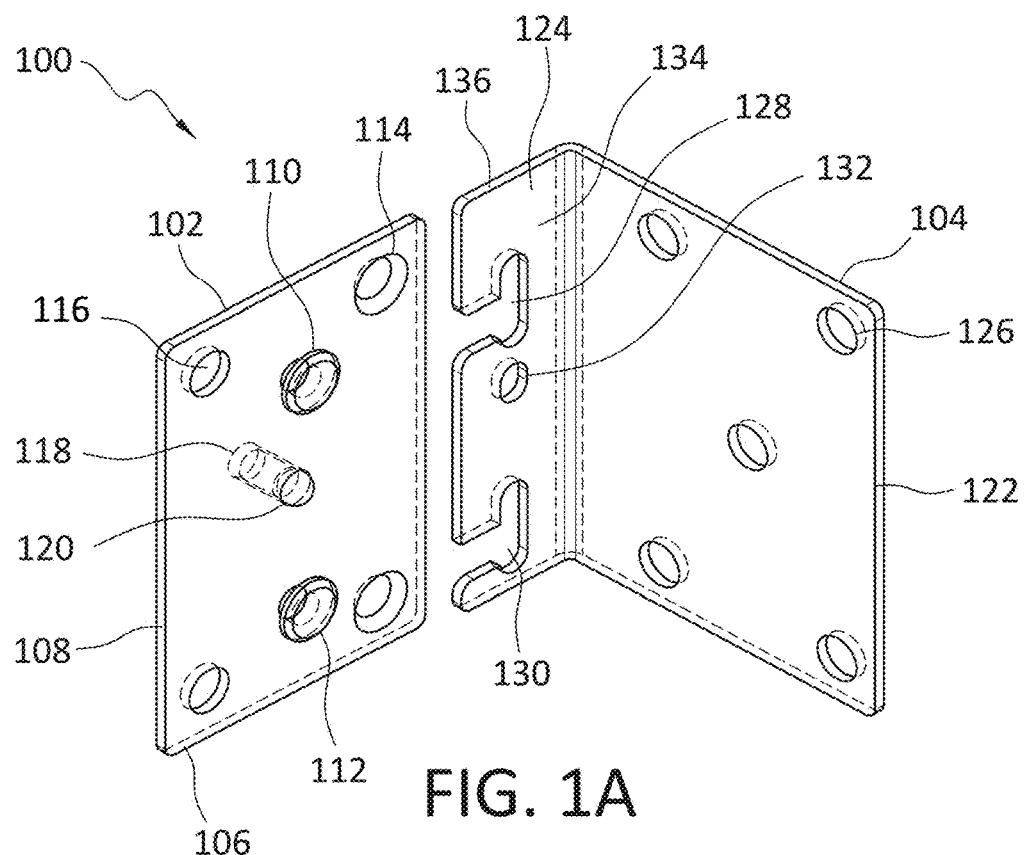
FIG. 1A is a top perspective view of an exemplary bracket apparatus in a disassembled position according to certain embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Coupling may be for any length of time, e.g., permanent or semi-permanent or only for an instant. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXEMPLARY EMBODIMENTS

The present disclosure relates to furniture products that can be assembled and disassembled without the need for tools or hardware. The furniture products are equipped with a novel bracket apparatus that enables the furniture products to be stored, shipped, assembled, and disassembled without the need to ship or purchase additional tools or hardware. For example, the furniture products with the integrated bracket apparatus initially can be packaged by a manufacturer without any additional tools or hardware. That is, the furniture products can be packaged with just the furniture components, thereby reducing the product package weight and shipping weight. Furniture products with the integrated bracket apparatus also reduce the complexity of assembly/disassembly by a user. For example, the user does not need to obtain and use any tools and does not need to obtain or use any hardware. This reduces the complexity of furniture assembly because a user simply has to connect corresponding furniture components without the use of any tools or hardware.

The principles discussed herein can be applied to any type of furniture or storage product. For example, the principles discussed herein can be applied to tables (e.g., cocktail tables, coffee tables, dining tables, refractory tables, drop-leaf tables, end tables, kitchen tables, and other types of tables), desks (e.g., writing desks, night stands, office desks, computer desks, credenza desks, and other types of desks), entertainment stands, work benches, seats (e.g., bench seats and chairs), dressers, bar units (e.g., mini bars, countertop bars, wine bars, and other types of bar units), storage units, bookcases, shelving products, cabinets, chests, beds, drawing boards, garden furniture, pet crates, and other types of furniture products. Any of the aforementioned furniture products (and/or other furniture products) can be equipped with the bracket apparatus described herein, which would permit the furniture products to be assembled and disassembled without any tools or hardware. The figures included with this disclosure provide details of a bracket apparatus for exemplary furniture products.

The furniture products can be constructed of any appropriate material. For example, furniture products or portions thereof may be constructed of and/or include: wood, polymers (e.g., plastics), metals and/or fabrics (e.g., cloths, leathers, and/or textiles). In certain embodiments, the furniture product can be constructed of rigid materials, such as wood, metals, and plastics, and, optionally, fabrics can be attached to the rigid structures. In certain embodiments, the bracket apparatus can be constructed of metal, plastic, and/or other rigid materials.

The bracket apparatus and furniture products described in this disclosure can be manufactured using any suitable technique. The various components of the bracket apparatus and furniture products can be constructed using different manufacturing techniques, and the components can then be combined and assembled to create the bracket apparatus and/or the furniture products. Exemplary techniques that may be utilized to manufacture the bracket apparatus, furniture products and/or their components include any or all of the following: wood-cutting techniques, molding techniques (e.g., blow-molding, injection-molding and compression-molding techniques), casting techniques (e.g., in which liquid material is poured into a mold), three-dimensional (3D) printing and additive manufacturing techniques, and machining techniques (e.g., in which a piece of material is cut into a desired final shape and size).

It should be recognized that the embodiments described in this disclosure can be combined in various ways. Any aspect or feature that is described in connection with one embodiment can be incorporated into any other embodiment mentioned in this disclosure. It should also be recognized that the inventive principles described in this disclosure are not limited to the particular embodiments illustrated in the figures.

In certain embodiments, a bracket apparatus is provided comprising: a female plate including a mounting portion and a coupling portion, the mounting portion coupled to a surface of a furniture product, the coupling portion including a first slot, a second slot, and a hole formed in a surface of the coupling portion; and a male plate including a first protrusion, a second protrusion, and a biasing element reservoir, the first protrusion and the second protrusion extend outward from a front surface of the male plate, a rear surface of the male plate to abut the furniture product, the biasing element reservoir to extend from the front surface to the rear surface, the biasing element reservoir to retain a biasing element.

Figure 1B:
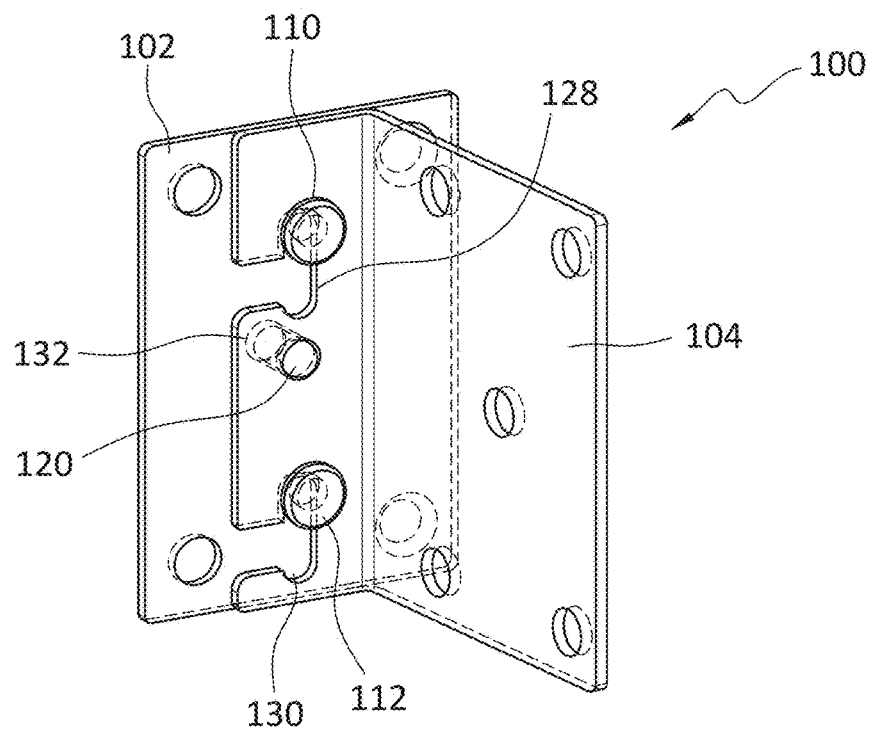
FIG. 1B is a top perspective view of the exemplary bracket apparatus shown in FIG. 1A in an assembled position according to certain embodiments.

Moving on to the figures, FIGS. 1A-1B illustrate an exemplary bracket apparatus 100 according to certain embodiments. FIG. 1A is a top perspective view of the bracket apparatus 100 in a disassembled position. FIG. 1B is a top perspective view of the bracket apparatus 100 in an assembled position.

In the exemplary embodiment of FIG. 1A, the bracket apparatus 100 includes a male plate 102 and a female plate 104. The male plate 102 includes a front surface 106 and a rear surface 108. The male plate 102 includes a first protrusion 110 and a second protrusion 112 that extend outward from the front surface 106. The male plate 102 includes a first opening 114 and a second opening 116. The first opening 114 and the second opening 116 receive fasteners (e.g., screws, bolts, etc.) to couple the male plate 102 to a first component of furniture product. In some embodiments, the rear surface 108 of the male plate 102 abuts the first component of the furniture product. The male plate 102 of the illustrated example includes a biasing element reservoir 118 and a biasing element 120. In some embodiments, the biasing element 120 is a spring. In some embodiments, the biasing element 120 is a capsule and a spring. In some embodiments, the biasing element is a biasing pin and a spring.

The female plate 104 includes a mounting portion 122 and a coupling portion 124. The mounting portion 122 of the illustrated embodiment includes one or more holes 126. The holes 126 are to receive fasteners to couple the mounting portion 122 and, thus, the female plate 104 to a second component of the furniture product. The coupling portion 124 includes a first slot 128, a second slot 130, and a hole 132 formed in an interior surface 134 of the coupling portion 124.

To assemble the first component of the furniture product to the second component of the furniture product as shown in FIG. 1B, the coupling portion 124 of the female plate 104 is guided toward the male plate 102. While the coupling portion 124 is guided toward the male plate 102, an exterior surface 136 of the coupling portion 124 engages the biasing element 120 to urge the biasing element 120 into the biasing element reservoir 118. The coupling portion 124 continues toward the male plate 102 until the first slot 128 receives the first protrusion 110 and the second slot 130 receives the second protrusion 112. When the first protrusion 110 is in the first slot 128 and the second protrusion 112 is in the second slot 130, the coupling portion 124 is lowered until the exterior surface 136 is no longer urging the biasing element 120 in the biasing element reservoir 118 and the biasing element 120 is biased into the hole 132. The biasing element 120 mitigates movement of the male plate 102 and the female plate 104 when the biasing element 120 is biased in the hole 132, thereby coupling the first component of the furniture product to the second component of the furniture product.

Figure 2A:
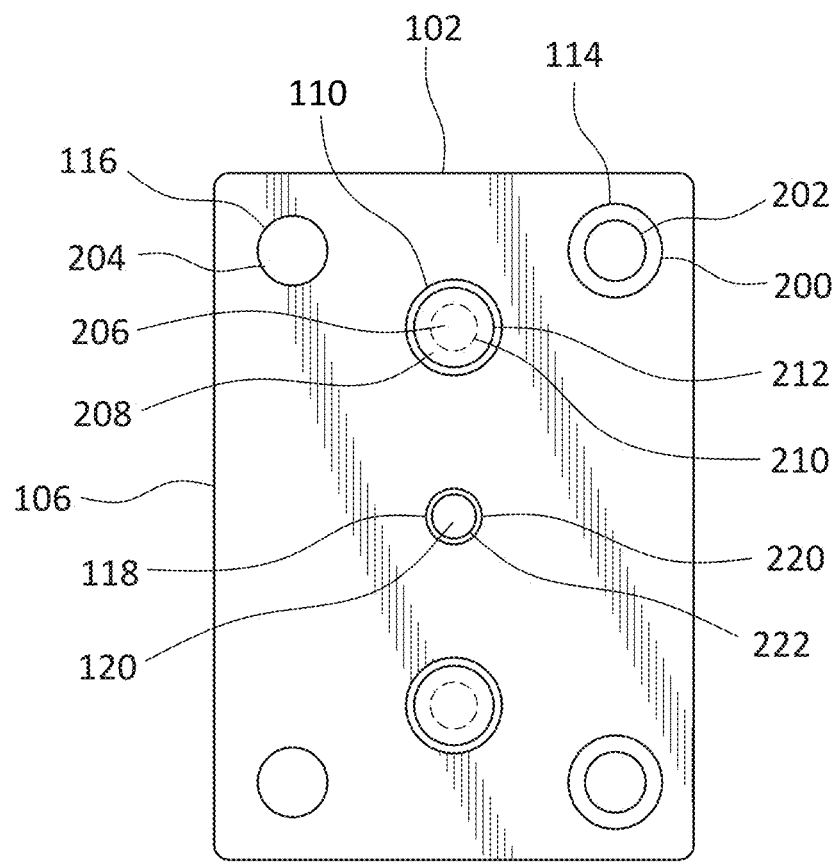
FIG. 2A is a front view of an exemplary male plate according to certain embodiments.

FIG. 2A is a front view of the exemplary male plate 102. In the illustrated embodiment of FIG. 2A, the male plate 102 includes the first opening 114 and the second opening 116. In the illustrated embodiments of FIGS. 2A and 2B, the first opening 114 has a first diameter 200 adjacent the front surface 106 of the male plate 102 and a second diameter 202 adjacent the rear surface 108 of the male plate 102. In the illustrated embodiment, the first diameter 200 is different than the second diameter 202. In some embodiments, the first diameter 200 and the second diameter 202 are sized to accommodate a type of fastener. In the illustrated example, the first diameter 200 and the second diameter 202 are sized to form a tapered shape to accommodate a fastener with a corresponding tapered head portion. In the illustrated embodiment, the second opening 116 has a third diameter 204. In some embodiments, the third diameter 204 is sized to accommodate a type of fastener. In the illustrated example, the third diameter 204 is sized to form a uniform circumferential shape to accommodate a fastener with a uniform circumferential head portion.

Figure 2B:
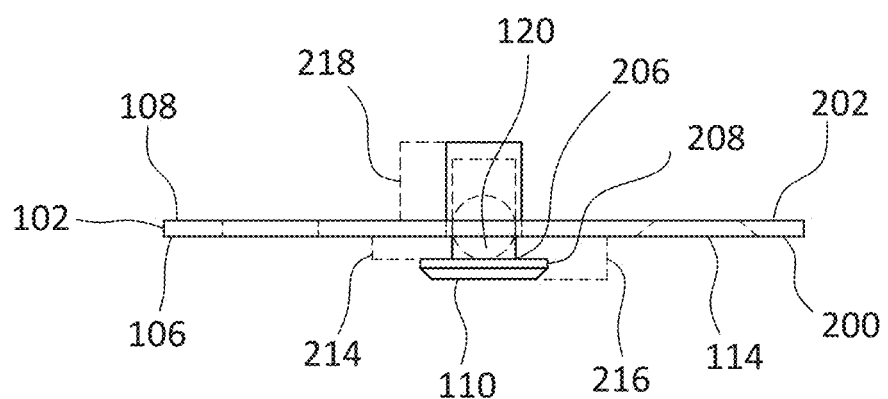
FIG. 2B is a top view of the exemplary male plate shown in FIG. 2A according to certain embodiments.

FIG. 2B is a top view of the exemplary male plate 102. In the illustrated embodiment, the first protrusion 110 includes a first post 206 and a first head 208. In the illustrated embodiments of FIGS. 2A and 2B, the first post 206 has a first diameter 210 and the first head 208 has a second diameter 212. In the illustrated embodiment, the first diameter 210 of the first post 206 is sized to allow the first post 206 to be positioned within the first slot 128 and the second diameter 212 of the first head 208 is sized to maintain the first post 206 in the first slot 128.

In the illustrated embodiment of FIG. 2B, a portion of the biasing element 120 extends outward from the front surface 106 of the male plate 102 a first distance 214. In the illustrated embodiment, the first protrusion 110 (and the second protrusion 112) extend outward from the front surface 106 of the male plate 102 a second distance 216. In some embodiments, the first distance 214 is different than the second distance 216. In the illustrated embodiments, the first distance 214 and the second distance are sized to allow the coupling portion 124 to urge the biasing element 120 into the biasing element reservoir 118. That is, the first distance 214 and the second distance 216 are sized to allow the coupling portion 124 to urge the biasing element 120 into the biasing element reservoir to allow the first protrusion 110 to be positioned in the first slot 128 and allow the biasing element 120 to be biased into the hole 132 to mitigate the male plate 102 from uncoupling the female plate 104. In the illustrated embodiments, the biasing element reservoir 118 extends from the front surface 106 of the male plate 102 toward the rear surface 108 of the male plate 102. In the illustrated embodiment, the biasing element reservoir 118 extends beyond the rear surface 108 of the male plate 102 a third distance 218. In some embodiments, the third distance 218 is sized to position the biasing element reservoir 118 within the first furniture component of the furniture product when the male plate 102 is coupled to the first component of the furniture product. In the illustrated embodiments, the biasing element reservoir 118 has a first diameter 220 and the biasing element 120 has a second diameter 222. In some embodiments, the first diameter 220 and the second diameter 222 are sized to securely maintain the biasing element 120 within the biasing element reservoir 118.

Figure 3A:
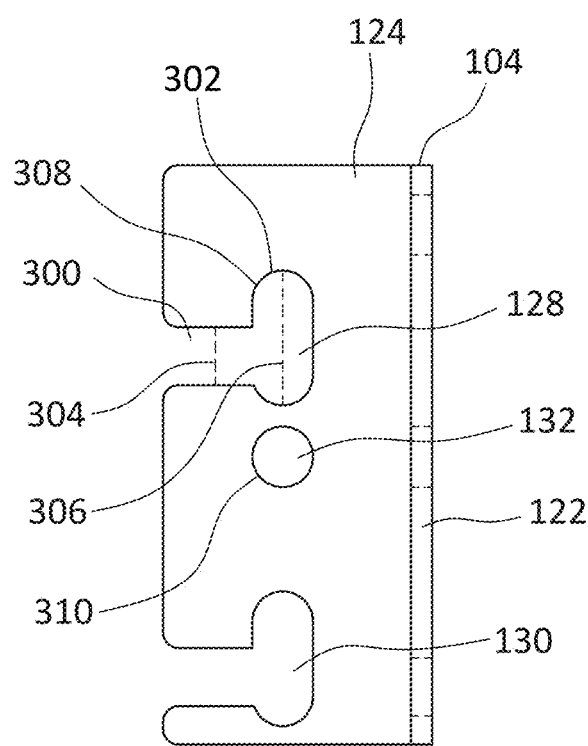
FIG. 3A is a front view of an exemplary female plate according to certain embodiments.

FIG. 3A is a front view of the exemplary female plate 104. In the illustrated embodiment, the first slot 128 includes an opening 300 and a circumferential slot 302. In the illustrated embodiment, the opening 300 has a first size 304 and the circumferential slot 302 has a second size 306. In some embodiments, the first size 304 and the second size 306 are sized based on the first diameter 210 of the first post 206. That is, the first size 304 and the second size 306 are sized based on the first diameter 210 of the first post 206 to secure the first post 206 of the first protrusion 110 within the first slot 128. In some embodiments, the second size 306 of the circumferential slot 302 is sized to allow movement of the first post 206 within the circumferential slot 302. In some embodiments, the circumferential slot 302 is sized to allow the first post 206 to maneuver within the circumferential slot 302 and still allow the coupling portion 124 to urge the biasing element 120 in the biasing element reservoir 118 until the first post 206 is positioned at a first end 308 of the circumferential slot 302. In some embodiments, the second slot 130 is sized based on the first slot 128. In the illustrated embodiment, the hole 132 has a hole diameter 310. In some embodiments, the hole diameter 310 is sized based on the second diameter 222 of the biasing element 120 to securely maintain the biasing element 120 within the hole 132.

To disassemble the first component of the furniture product from the second component of the furniture product, a user simply urges (e.g., presses) the biasing element 120 into the biasing element reservoir 118 and lifts the coupling portion 124 (e.g., the second component of the furniture product) until the biasing element 120 is either in contact with the exterior surface 136 of the coupling portion 124, or the first protrusion 110 and the second protrusion have been removed from the first slot 128 and the second slot 130, respectively, thereby decoupling the furniture product components.

Figure 3B:
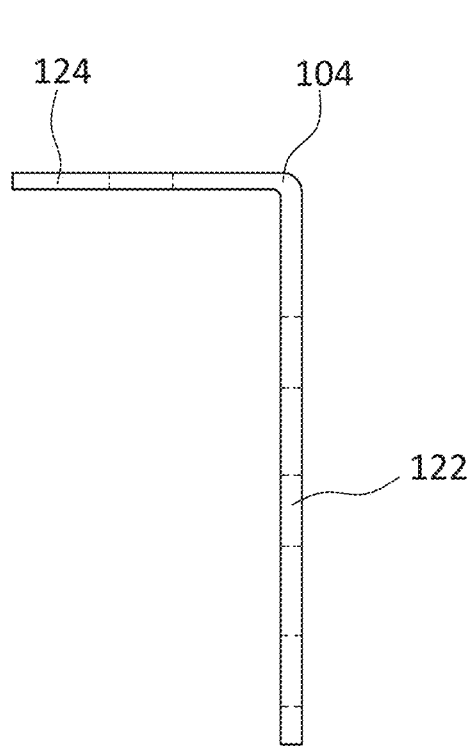
FIG. 3B is a top view of the exemplary female plate shown in FIG. 3A according to certain embodiments.

FIG. 3B is a top view of the exemplary female plate 104. In the illustrated embodiment, the mounting portion 122 is approximately perpendicular to the coupling portion 124.

FIGS. 4A and 4B are alternate views of the exemplary bracket apparatus 100.

FIG. 5 is a top perspective view of the exemplary biasing element 120. In the illustrated embodiment, the biasing element 120 includes a biasing pin 500 and a spring 502. In some embodiments, the spring 502 is positioned in the biasing element reservoir 118 and a portion of the biasing pin extends out of the biasing element reservoir and outward from the front surface 106 of the male plate 102. In some embodiments, the biasing pin 500 and the spring 502 are integral. That is, the biasing pin 500 and the spring 502 are one uniform structure. In some embodiments, the biasing pin 500 and the spring 502 are two separate structures that are coupled together.

In some embodiments, the exemplary bracket apparatus 100 can be packaged in a kit. In some embodiments, the kit includes a furniture product including a first component and a second component, a male plate coupled to the first component and a female plate coupled to the second component. Such a kit reduces the size and weight of a furniture product package by eliminating the need to pack and ship additional tools and hardware. Further, such a kit simplifies the assembly and disassembly process, thereby making furniture assembly more efficient.

It should be recognized that numerous variations can be made to the above-described systems and methods without departing from the scope of the invention.

While various novel features of the invention have been shown, described, and pointed out as applied to particular embodiments thereof, it should be understood that various omissions, substitutions and changes in the form and details of the systems and methods described and illustrated may be made by those skilled in the art without departing from the spirit of the invention. Amongst other things, the steps shown in the methods may be carried out in different orders in many cases, where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components are for illustrative purposes to facilitate a full and complete understanding and appreciation of the various aspects and functionality of particular embodiments of the invention, as realized in system and method embodiments thereof. Those skilled in the art will appreciate that the invention can be practiced in other than the described embodiments, which are presented for purposes of illustration and not limitation.

What is claimed is:

1. A bracket apparatus comprising:
a female plate including a mounting portion and a coupling portion, the coupling portion including a first slot, a second slot, and a hole formed in a surface of the coupling portion; and
a male plate including a first protrusion, a second protrusion, and a biasing element reservoir, the first protrusion and the second protrusion extend outward from a front surface of the male plate, the biasing element reservoir to extend from the front surface to a rear surface of the male plate, the biasing element reservoir to retain a biasing element, the male plate includes a first opening and a second opening, the first opening having a first diameter adjacent the front surface and a second diameter adjacent the rear surface, the first diameter different than the second diameter, the second opening having a third diameter, the third diameter different than the first diameter and the second diameter.

2. The apparatus of claim 1, wherein the first slot is to receive the first protrusion, the second slot is to receive the second protrusion, and the hole is to receive a biasing pin to couple the female plate to the male plate.

3. The apparatus of claim 2, wherein the biasing pin is coupled to the biasing element.

4. The apparatus of claim 3, wherein a portion of the biasing pin is to extend outward from the front surface of the male plate a first distance.

5. The apparatus of claim 4, wherein the first protrusion and the second protrusion extend outward from the front surface of the male plate a second distance, the first distance different than the second distance.

6. The apparatus of claim 5, wherein the first distance and the second distance are sized to allow the coupling portion to urge the biasing pin into the biasing element reservoir.

7. The apparatus of claim 6, wherein the biasing element is to bias the biasing pin in the hole when the first protrusion is in the first slot and the second protrusion is in the second slot to mitigate movement of the female plate and the male plate.

8. The apparatus of claim 1, wherein the first protrusion includes a first post and a first head.

9. The apparatus of claim 8, wherein the first post has a first diameter and the first head has a second diameter, the first diameter sized to allow the first post to be positioned within the first slot, the second diameter sized to maintain the first post in the first slot.

10. The apparatus of claim 1, wherein the first opening is to receive a first type of fastener to couple the male plate to a furniture product, the second opening to receive a second type of fastener different than the first type of fastener to couple the male plate to the furniture product.

11. The apparatus of claim 1, wherein the mounting portion is approximately perpendicular to the coupling portion.

12. A kit comprising:
a furniture product including a first component and a second component;
a male plate coupled to the first component, the male plate including a protrusion and a biasing element positioned in a biasing element reservoir, the biasing element reservoir to be positioned within the first component; and
a female plate coupled to the second component, the female plate including an opening, a circumferential slot, and a hole, the opening to receive the protrusion and the protrusion to be positioned in the circumferential slot, the hole to receive the biasing element when the protrusion is positioned in the circumferential slot to couple the first component to the second component.

* * * * *